Sept. 1, 1970 V. L. TRUITT 3,526,031
STRUCTURAL ASSEMBLY AND METHOD
Filed March 1, 1968
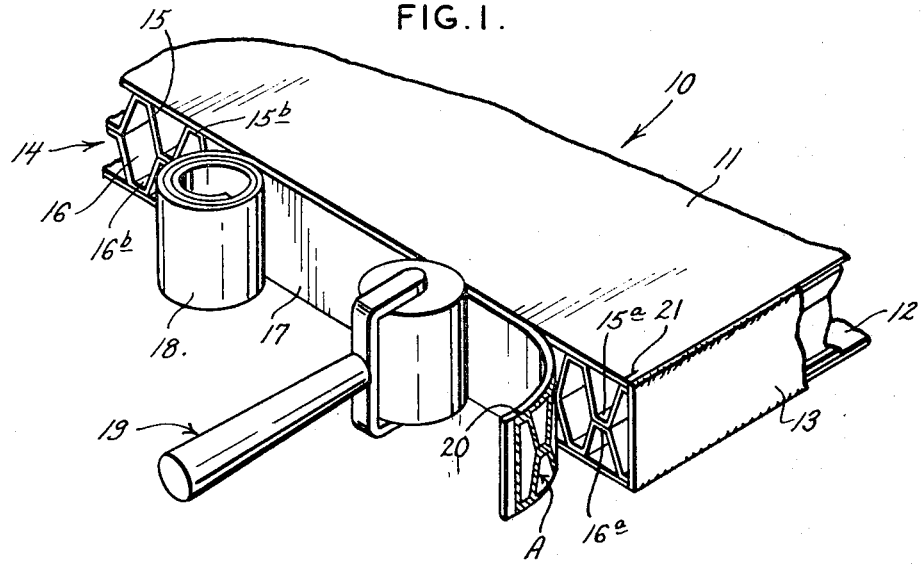
FIG. 1.
FIG. 3. FIG. 2. FIG. 4.
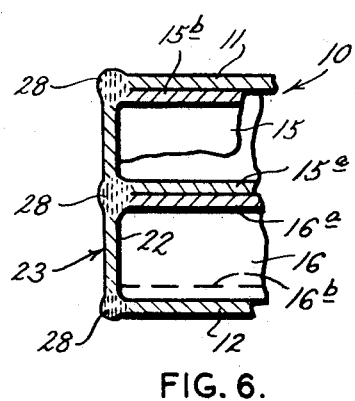
FIG. 6.
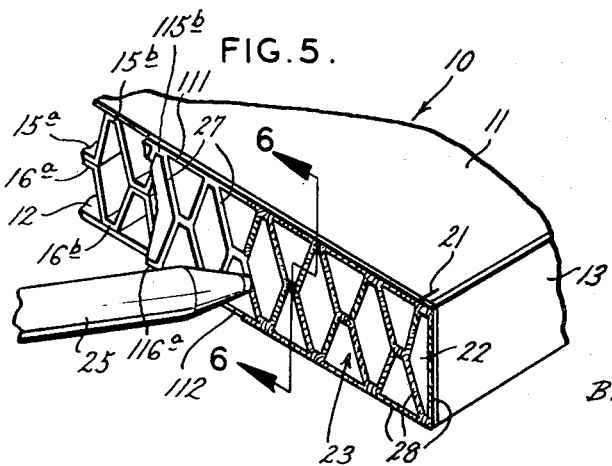
FIG. 5.
INVENTOR
VINCENT L. TRUITT
BY Gravely, Lieder & Woodruff
ATTORNEYS

United States Patent Office 3,526,031
Patented Sept. 1, 1970

3,526,031
STRUCTURAL ASSEMBLY AND METHOD
Vincent Lee Truitt, Des Peres, Mo., assignor to McDonnell Douglas Corporation, St. Louis County, Mo., a corporation of Maryland
Filed Mar. 1, 1968, Ser. No. 709,611
Int. Cl. B23k *31/02*
U.S. Cl. 29—471.1                    5 Claims

ABSTRACT OF THE DISCLOSURE

A structural assembly in which the attachment of a member to hidden or blind components is easily carried out through the practice of a method of transferring the image of the hidden or blind components to the visible surfaces of the attachment member so that the image can be used to guide the operator in effecting the mounting of the member.

---

This invention relates to the making of a structure and to the method employed in carrying out the making of such structure, and it is particularly concerned with structural fabrication where the operation must be performed from the blind side.

There are many situations in fabricating structures where a closure member has to be applied to components that cannot be seen when the closure member is in its intended position. Blind riveting is, of course, known, but where rivets cannot be used there is great difficulty in making a secure and structurally sound attachment of a structural component that necessarily covers the working area. One specific problem is encountered in applying a closure member to the open end of a cellular assembly, and other similar problems will come to mind from the following disclosure.

It is, therefore, an important object to provide a method of attaching a closure component to other hidden components such that a structurally sound assembly may be achieved.

An equally important object of the invention is to provide an assembly of components where the attachment between components can be made from the blind sides thereof.

It is also an object of this invention to provide a fabricated structural assembly in which certain components are attached from the exterior to hidden components within the assembly.

An object of this invention resides in the unique fabrication of a structural assembly and in the method for achieving the assembly so that the problems heretofore existing may be overcome in a simple and economical manner.

A preferred embodiment of the invention, for purposes of illustrating the embodiment of a structurally sound assembly and the method involved, comprises a honeycomb structure requiring a closure member, means for securing an accurate image of the hidden configuration, treatment of the closure member to transfer the image thereto, and the application of securing means to the image so that proper connection is obtained between the closure member and the actual hidden structure.

The invention also resides in the assembly of components and the method of making the assembly, all as hereinafter set forth, reference being had to the several views in the accompanying drawings, wherein:

FIG. 1 is a fragmentary perspective view of a portion of a cellular structure being subjected to the image making step in the method of this invention;

FIG. 2 is a fgragmentary perspective view of the closure means on which the cellular image is impressed;

FIG. 3 is a view taken at line 3—3 in FIG. 2 showing the formation of the cellular image formed in one surface of the closure means;

FIG. 4 is another view of the closure means taken at line 4—4 in FIG. 2 to show the image formed in one surface;

FIG. 5 is a fragmentary perspective view of the attachment of the closure means of FIGS. 2, 3 and 4 to the cellular structure of FIG. 1; and FIG. 6 is a sectional view of a portion of the finished structure, the same being taken at line 6—6 in FIG. 5.

In practicing this invention, it is important to determine the location and configuration of the components that will necessarily be hidden when the covering component is assembled to such hidden components, and for this determination an image of the hidden structure is first produced. The resulting image is accurate in all essential details and may be then transferred to the actual covering component in such manner that the image transfer is sufficiently permanent to be later used as a guide for applying the securing means through the cover component to the hidden components. The final step is to effect the attachment of the cover component.

Turning to FIG. 1, there is shown a fragmentary part of a cellular body such as honeycomb structure 10 having a top sheet 11, bottom sheet 12, side closure 13 and the cellular core 14 composed of a corrugated sheet 15 suitably joined to a similar but reversely related corrugated sheet 16 at the corrugation crests 15a and 16a. The corrugation valleys 15b and 16b respectively are suitably secured to the respective top and bottom sheets 11 and 12. The components of the structure 10 may be secured by any of the available means, such as resistance or fusion welding.

As is shown in FIG. 1 the open side of the cellular core 14 is covered by a strip of pressure sensitive tape 17 that has its sensitized face 18 pressed upon the open core 14, as by a roller device 19, such that the image A of the open end of the honeycomb core 14 is accurately and fully transferred to the sensitive face 18. The tape 17 is marked at index 20 to match a similar index mark 21 on the structure 10. The image A from the tape 17 is then transferred to the surface 22 of a closure member 23 and in the transfer the index mark 20 is also transferred at 20a to the member 23 is accomplished by making a photo negative ber over the open end of the core 14 is assured.

The image transfer from the tape 17 to the closure member 23 is accomplished by making a photo negative (not shown) of the various end portions of the corrugated sheets 15 and 16, and the end edges of the top end bottom sheets 11 and 12 and the side closure 13 are included. The photo negative then becomes a negative pattern which can be applied in any convenient manner, as by being photo sensitized directly on the surface 22 of the member 23. The pattern may be applied on one or both sides of the member 23, although only one side is shown. After the pattern has been impressed upon the member 23 a chem-etch step is practiced on the member 23 to a depth substantially equal to the required gage thickness of the structure. The index mark 20a is, of course, retained during these steps. The member 23, as may be seen in FIGS. 3 and 4, is etched at 115b and 116a to correspond with the corrugation valleys 15b and 16b respectively, and it is also etched at 115a to correspond to the joined corrugation crests 15a and 16a respectively. The etching includes marginal grooves 111 and 112 which match the edges of the top and bottom sheets 11 and 12 respectively.

More particularly the transfer of the hidden image to the visible surface of the closure means may be accompilshed by any of the following methods:

With a tape or film, the emulsion side is placed against the structure which will be hidden by the closure means and pressure is applied over the entire area by the roller tool 19, or similar tool, thus picking up the image desired. A photograph is then taken of the emulsion side of the film or tape and the photo negative thus secured is used to transfer the desired image to the surface of the closure means which has been photosensitized. The surface is cured with a suitable light. Where the light does not penetrate the photosensitizer will not cure out and this portion is removed with a suitable solvent, thus leaving the surfaces bare in the areas which represent the hidden structure. The bare areas are then subjected to a chemical blanking step which removes the metal to the desired depth, say of about .001 to .004 inch. The thus treated means is dipped in a solvent to remove the cured photosensitizer coating and the means is complete and can be secured in position as will presently be described.

Another method is, where possible, to take a photograph of the structure to produce an image thereof and a negative is then made. The procedure to follow thereafter is as described above.

Still another method is to cut a narrow strip off of the structure to be closed in and to convert the strip into an electrode to be used in an eletcro-discharge machine, such as an Elox machine. The strip is then copper plated over the image to be reproduced so it can be used as the electrode in the Elox machine. The closure means is then placed in the Elox machine and the material in the image areas is discharged away following the copper plated image. The finished closure means is then ready to be attached over the hidden structure by electron beam welding procedures. This method is best applied where heavy structure or fittings are involved. Where the thickness of the surfaces of the strip cut off of the parent structure is about one quarter inch it is best to reduce the thickness by chem-milling and then copper plate the surfaces back to the original thickness so as to make a good electrical conductor for the Elox machine.

Where a heavy gauge closure means is to be welded to a thinner structure and still keep the welding specification thickness ratio, a double image will be required on the closure means. This is easily visualized in FIGS. 2, 3 and 4 where the image shown is reproduced on the reverse surface so that the same image appears on both surfaces. Each image is produced by any of the foregoing methods and the thickness of the material between images is controlled so it is in conformity to the welding specification ratio. The welding is applied along the image outlined and any build-up of weld material can be machined off to a smooth surface.

Where the structure permits, a print of the surfaces to be used for attachment of the closure can be made by using ink mediums or carbon which can be applied to the surfaces to be reproduced. The closure means or a temporary substitute therefor can be pressed over the ink or carbon to pick off the image outline. This image outline may then be put through the previously described steps leading to the reproduction of the image on the actual closure means.

The member 23 as produced by the techniques above described is next placed (FIG. 5) over the open end of the cellular core 14 in alignment with the index 21 and is tack welded to hold it in proper position for the final assembly step. The final step is to arc seam weld by means 25 along the etched grooves 111, 112, 115b and 116a, as well as the rest of the intervening grooves 27 (see FIGS. 2 and 5). This step builds up material at 28 (FIG. 6) in the etched grooves and secures the member 23 in final position with the material 28 penetrating through the member 23 to mate with the several edges of the core 14 and the top and bottom sheets 11 and 12, as well as the side closure 13. A machining operation will be required to produce a smooth surface.

The advantage of this fabricated structure and the herein disclosed method is that the member 23 is securely attached without failure in mating the weld seams to the edges of the hidden components. Another advantage is that the method employed permits the joining of thin gauge components to heavier gauge components. While welding is disclosed, it is understood that brazing or bonding may also be resorted to.

The foregoing description has set forth a presently preferred embodiment of the invention, but modifications will be apparent to those skilled in the art. It is, therefore, intended to include all possible modifications within the scope of the appended claims.

What is claimed is:

1. A method of assembling a closure member over the exposed components of a body structure, said method including the steps of producing an image of the exposed body components on a temporary member, transferring the image to a closure member by engraving the image in the closure member and connecting the closure member from the exterior thereof to the body components at the thus transferred image.

2. In the method set forth in claim 1, producing the image by applying pressure sensitive means or a pick-up by means of ink carbon, etc. over the exposed components to substantially reproduce the configuration of the components.

3. In the method set forth in claim 2, transferring the image by etching the image into the closure member and locating the closure member over the exposed components with the etched image outermost and substantially registered with the components to hide the components.

4. In the method set forth in claim 1, transferring the image upon a closure member by etching the image into the material or the closure member, and connecting the closure member by welding within the etched image.

5. A method of blind attachment of a closure member over initially exposed components of a body structure which includes the steps of producing a print of the configuration of the body components to be closed in, photosensitizing the print upon a closure member, converting the image to a permanent image outline on the closure member by engraving the image in the closure member, and structurally uniting the closure member to the body components along the permanent print outline.

References Cited

UNITED STATES PATENTS

| | | | |
|---|---|---|---|
| 3,070,880 | 1/1963 | Davis et al. | 29—471.1 |
| 3,106,014 | 10/1963 | Brick et al. | 29—483 XR |
| 3,140,538 | 7/1964 | Rutledge | 29—483 XR |
| 3,324,544 | 6/1967 | Haller | 29—482 XR |

CHARLIE T. MOON, Primary Examiner

R. B. LAZARUS, Assistant Examiner

U.S. Cl. X.R.

29—482, 483; 52—624; 161—68

// PO-1050
(5/69)

UNITED STATES PATENT OFFICE
CERTIFICATE OF CORRECTION

Patent No. 3,526,031      Dated September 1, 1970

Inventor(s) Vincent L. Truitt

It is certified that error appears in the above-identified patent and that said Letters Patent are hereby corrected as shown below:

Col. 1, line 55, after "the" and before "of", cancel "embodiment" and substitute therefor -- "achievement".

Col. 2, line 44, after the numeral "23", the following phrase "is accomplished by making a photo negative ber" should read -- "so that the subsequent alignment of the member"

Col. 3., line 56, "reporduction" should be "reproduction".

SIGNED AND
SEALED
NOV 17 1970

(SEAL)
Attest:

Edward M. Fletcher, Jr.
Attesting Officer

WILLIAM E. SCHUYLER, JR.
Commissioner of Patents